United States Patent [19]

Kralles et al.

[11] Patent Number: 5,406,352
[45] Date of Patent: Apr. 11, 1995

[54] PHOTOGRAPHIC FILM SEGMENT FLATTENING APPARATUS

[75] Inventors: Christopher J. Kralles, Rochester; Thomas C. Jessop, Webster, both of N.Y.

[73] Assignee: Eastman Kodak Company, Rochester, N.Y.

[21] Appl. No.: 166,769

[22] Filed: Dec. 14, 1993

[51] Int. Cl.$^6$ ............................................. G03B 27/62
[52] U.S. Cl. ..................................... 355/75; 355/72; 355/76
[58] Field of Search ........................ 355/72, 75, 76

[56] References Cited

U.S. PATENT DOCUMENTS

| | | | |
|---|---|---|---|
| 2,199,305 | 4/1940 | Dewey | 355/75 |
| 2,251,184 | 7/1941 | Bohannon | 355/75 |
| 3,288,027 | 11/1966 | Ruzika | 88/24 |
| 3,488,120 | 1/1970 | Nagel | 355/75 |
| 3,542,471 | 11/1970 | Dubay | 355/75 |
| 3,779,643 | 12/1973 | Nosco et al. | 355/75 |
| 4,181,428 | 1/1980 | Proulx | 355/75 |
| 4,241,993 | 12/1980 | Guillaume | 355/75 |
| 4,353,645 | 10/1982 | Kogane et al. | 355/75 |
| 4,769,678 | 9/1988 | Komoda et al. | 355/39 |
| 4,774,553 | 9/1988 | Blanding et al. | 355/75 |
| 4,924,258 | 5/1990 | Tsutsui | 355/53 |
| 4,965,632 | 10/1990 | Jadrich et al. | 355/76 |
| 5,028,956 | 7/1991 | VanScotter | 355/72 |
| 5,055,874 | 10/1991 | Kralles et al. | 355/76 |
| 5,111,241 | 5/1992 | Kralles | 355/75 |

*Primary Examiner*—Michael L. Gellner
*Assistant Examiner*—Daniel P. Malley
*Attorney, Agent, or Firm*—Joseph F. Breimayer

[57] ABSTRACT

A film flattening apparatus and method of operation for a printer particularly operable in a film flattening mode for flattening image frames of filmstrip segments attached by a side attached tow web and transported through a transport path gap between the flattening apparatus and an aperture formed in a stationary film transport base. The flattening apparatus is formed of first and second clamping members suspended apart from the base in a retracted position during the web transport and moved toward the base to a contact position pressing against the longitudinal or lateral and the transverse edges of the filmstrip image frame in a film flattening mode. The first and second clamping members are formed with longitudinally and transversely extending clamping elements, respectively and are suspended apart from one another and the base in the retracted position and advance sequentially in a nested relation toward the base and the contact position in the film flattening mode. In the film transport mode, the longitudinally extending clamping elements guide against the filmstrip lateral edges and tend to flatten excessively, transversely curled filmstrip segments. The transversely extending clamping elements are positioned further apart in the transport mode and out of interference with the filmstrip segment leading ends transversely curled centrally toward the second clamping member. Preferably, the base has a thickness within which sculpted, arcuate reliefs are formed centered on the mid-point of the transverse opening edges of the aperture and provide upward guidance to filmstrip leading ends transversely curled centrally toward the aperture in the base.

25 Claims, 5 Drawing Sheets

PHOTOGRAPHIC FILM SEGMENT FLATTENING APPARATUS

CROSS REFERENCE TO RELATED APPLICATION

Reference is made to U.S. patent application Ser. No. 08/167,643 filed on Dec. 14, 1993 and entitled "Film Clamp For Flattening Image Frames in a Scanning Gate", U.S. patent application Ser. No. 906,635 filed on Jun. 30, 1992, and entitled "Multiformat Film Clamp" and U.S. patent application Ser. No. 074,894 filed on Jun. 10, 1993 and entitled "Improved Multiformat Film Clamp".

FIELD OF THE INVENTION

The present invention relates to handling exposed photographic filmstrips during photofinishing, particularly in the transport of make over web attached, negative filmstrip segments having a natural tendency to curl into a printer exposure gate and flattening the film frame without stubbing the ends of the filmstrip segments to ensure correct focusing and printing of the image in the frame.

BACKGROUND OF THE INVENTION

Photographic film is typically formed of a film base having photo sensitive emulsion layers coated thereon in which an image may be captured, typically in a camera. When cut into an elongated filmstrip, the film has a natural tendency to curl back on itself in both the elongated, axial direction and the width or transverse direction to a degree depending on the film base and the filmstrip dimensions. The filmstrip is typically packaged tightly wound in a cartridge and partially unwound within the camera for making exposures. The cartridge and filmstrip may be stored for a period of time and under varying conditions of temperature and humidity such that the filmstrip takes on an accentuated "core set" film curl. Film curl is evident in elongated negative filmstrips after processing prior to making prints and also in the shorter segments that negative filmstrips are cut into after photofinishing to fit the segments into an envelope with the customer ordered prints.

Automated photographic printers for making positive paper prints from image frames of processed negative filmstrips are well known in the photographic art. Most automated printers have a film transport mechanism for step-wise advancing the filmstrip an image frame at a time from a supply reel to a takeup reel or the like and through an image frame sized scanning gate and an exposure gate at a high speed. In the scanning gate, the density and color balance of the negative may be automatically read out, and exposure parameters may be calculated and stored in memory until the same image frame is advanced into the exposure gate. In both the momentary scanning and exposure operation, it is highly desirable that the image frame be held down flat and then released for high speed advancement of the next frame.

Elongated negative filmstrips that are printed for the first time in filling a customer order are typically spliced together in the leading and trailing segments to form a continuous band wound on a supply reel and referred to herein as a "first order web". After exposure of the image frames the negative filmstrips are separated and sliced into segments that contain four or more image frames. After processing the prints made from a customer order, the negative filmstrip segments and the prints are re-united and packaged automatically.

At times, following inspection of the prints, it is necessary to reprint certain image frames of the shortened segments. In addition, at a later time, customers may order reprints of selected image frames for their own reasons. In order to efficiently make such reprints, it is necessary to attach the filmstrip segments in a spaced apart, end-to-end fashion, e.g. along one lateral edge of each filmstrip to a tow web as shown in FIG. 1, and referred to herein as a "second order web".

When the filmstrip segments $10_1$–$10_n$ are so attached to the tow web 20, the leading ends $12_1$–$12_n$ are separated from the trailing ends $14_1$–$14_n$ of adjacent segments by gaps $16_1$–$16_n$ of about 0.5 inches. Each filmstrip segment $10_1$–$10_n$ includes a number, e.g. four, image frames $18_1$–$18_4$ of standard 35 mm dimensions. The side attached tow web 20 may be coded with information related to each filmstrip, e.g. customer and order identification of the image frame to be printed and the number of prints that may be read out by the printer and used to control transport and exposure operations.

The tow web 20 effectively widens the transport path for the film segments through a printer and is engaged by drive rollers of a transport mechanism to advance the filmstrip segments $10_1$–$10_n$ through the scanning gate and the exposure gate of the printer. For efficiency, the printer transport mechanism of a specific printer may be configured to transport only such spliced together segments $10_1$–$10_n$ attached to the tow web 20. Since automated printers are more frequently used to make prints from original, elongated filmstrips transported during the first printing thereof, an accessory transport mechanism, which may be temporarily substituted for the primary transport mechanism, may be provided for the occasional printing of a run of spliced together segments.

The spliced together segments $10_1$–$10_n$ exhibit a degree of core set film curl that varies from segment to segment resulting in upward (bowed centrally away from the aperture) and downward (bowed centrally toward the aperture) curvatures of the leading ends $12_1$–$12_n$ which can cause "stubbing" of the ends in the transport process, particularly as the leading ends $12_1$–$12_n$ enter the scanning and exposure gates. This inconsistent core set film curl may make it difficult for photofinishing equipment to handle the film during high speed printing transport. The film handling characteristics of transporting mechanisms vary widely and are typically preset or configured to accommodate an "average" film curl and are not readily adjusted without operator input. Thus, the equipment must be monitored, and halted if a malfunction occurs. Filmstrip segments that stub may be irreversibly damaged or have to be removed and be straightened, which may be difficult to do.

Various types of transport systems for advancing the filmstrip into and clamping arrangements for momentarily holding flat the image frame in the scanning and exposure gates are disclosed in my commonly assigned U.S. Pat. Nos. 5,111,241 and 5,055,874 and in other patents and literature. In the '241 patent, a Bernoulli effect is employed to provide an air bearing to minimize contact and drag during advancement of the filmstrip across a linear array scanning gate. The apparatus of the '241 patent may be used with both first order and second order webs.

In the '874 patent, film flatteners contact and hold down the lateral sprocket hole edges of the filmstrip image frame in the exposure gate. The filmstrip in the '874 patent is deflected in a serpentine path before and after the aperture of the exposure gate by deflectors that also only contact the sprocket hole edges in order to overcome the tendency of the filmstrip to curl transversely. This approaches is designed for transporting a first order web. In U.S. Pat. No. 4,353,645, a film advancement and flattening apparatus for continuously connected or individual short filmstrip segments is disclosed. A rectangular flattening frame having longitudinal and transverse frame members is attached to a solenoid operated, side mounted, hinged rocker. On operation of the solenoid rocker, the frame is lifted on the side mounted, hinged rocker during filmstrip advancement and rocked downward to engage the sides of the image frame against the stationary frame surrounding the exposure aperture. The side mounting and rocking motion presents the lower side of the transverse edges of the movable transverse frame members in an interfering position with upwardly bowed or curled filmstrip segments, resulting in stubbing of the leading end thereof. To alleviate this problem, it is suggested that the interior edges of the movable transverse frame members be curved, rather than straight. It is represented that the curvature deflects the upward bowed leading edge of a film segment downward so that it does not catch.

In a further prior art system employed with automatic printers manufactured by the assignee, film flattening in the exposure gate was effected by movable "picture frame" members positioned above and below the filmstrip which were moved apart to a rest position during filmstrip advancement and clamped together to hold the image frame fiat. The movable frame members were upstream and downstream, upper and lower, transverse clamping members. Stubbing of the leading ends of filmstrip segments advanced by the web is avoided by widening the rest position of the transverse clamping members. Doing so increases the path of travel and the time taken, which slows the overall transport speed and hourly printing rate of the printer. Scratching of the filmstrip image frame could also occur during transport to the next image frame.

These approaches, to the extent that they work in alleviating stubbing, are inefficient in that the operating speed of the printer is slowed by the speed of movement over the path of travel of the moving components of the flattening apparatus.

In a further context, it is known to flatten and position film image frames of filmstrips with respect to an aperture and frame in order to scan the frames to digitize and record the digitized information for reproduction in a video format. For example, photographic image frames are scanned and the image data derived from the scanning is transformed into a video bit stream employed in the recording of a compact video disc for "photo-CD" playback. Such filmstrip image frame flatteners are described in commonly assigned U.S. Pat. Nos. 4,965,632 and 5,028,956 and in the above cross-referenced applications. In the filmstrip flatteners disclosed in the '632 and '956 patents, image frames are stretched or tensioned laterally as a line contact gripping member is brought to bear along and upon one of the longitudinal image frame edges and pressed laterally to effect the lateral stretching while the other longitudinal edge is held stationary. The stretching is accomplished by slightly flattening tensioned arms connecting the line contact gripping members. It is difficult to maintain alignment of the line contact gripping members and to maintain constant stretching force and resulting lateral flatness because the tensioned spring arms fatigue and change shape over extended use.

Moreover, no control is exerted over the leading and trailing edges of excessively curled filmstrips by the film clamping apparatus disclosed in the '632 and '956 patents. In this regard, the leading and trailing edges of the first image frames of a curled filmstrip make it particularly difficult to flatten those frames with the apparatus disclosed in the '632 and '956 patents.

In the above referenced '635 and '894 applications, shaped, compliant material strips are employed as longitudinally and laterally extending clamping elements in a picture frame type mechanism for applying normal force to the image frame edges. In the approaches of the '635 and '894 applications, the shape and resilience of the material used for the clamping elements is relied on to provide some laterally extending force when the clamping element is deformed under high normal force. The normal and lateral force vector is achieved on buckling of the side walls of the shaped clamping elements.

These approaches are dependent on material selection to achieve lateral stretching of the filmstrip image frame, and it is difficult to achieve consistent and correct forces at the film/platen interface. Moreover, these approaches do not address the problem of providing high speed transport and handling of second order webs into the film clamping apparatus.

SUMMARY OF THE INVENTION

It is therefor a principal object of the invention to efficiently transport filmstrips, particularly in the transport of filmstrip segments into scanning and/or exposure gates of a photographic printer, and avoid handling difficulties occasioned by excessively upward or downward curled filmstrip segments.

It is a further object of the invention to efficiently transport a make over web of filmstrip segments into a scanning and/or exposure gate of a printer and to flatten a filmstrip image frame therein through short path of travel movement of film flattening and image frame components, despite upward or downward curvature of the filmstrips.

It is a still further object of the invention to efficiently transport such filmstrip segments cuffed transversely with respect to such a scanning and/or exposure gate through longitudinal guidance of upwardly curled filmstrips and transverse guidance of downwardly curled filmstrips.

These and other objects of the invention are met, in accordance with a first aspect of the invention, by an apparatus, and method of operation thereof, operable in a contact position for clamping and flattening a filmstrip image frame with respect to a fixed aperture and in a retracted position for unclamping and allowing rapid transport of filmstrips evidencing transversely extending film curl past the fixed aperture by a filmstrip transport mechanism and comprises a base having the fixed aperture formed in a fiat surface thereof, the base aperture bounded by pairs of transverse and longitudinal opening edges and side walls spaced apart to accommodate the filmstrip image frame and extending through the base, clamping means operable in a retracted position for allowing rapid transport of the filmstrip past the base, while making longitudinal contact with the longitudinal edges of the filmstrip for at least partially restraining the transversely extending film curl during transport, and operable in a contact position for applying clamping force longitudinally along the longitudinal edges and transversely across the filmstrip bordering an image frame thereof to flatten the image frame against said base aperture when transport is halted, and means formed in at least one of said transverse opening edges and side walls of said base aperture for guiding a filmstrip having a transverse curl extending toward the base aperture (i.e., downward) away from the base aperture and into transport space between the flat surface and the clamping member during the transport thereof by the transport mechanism to avoid stubbing of the leading end of the filmstrip on the transverse opening edges and side walls.

Preferably, the base has a thickness within which the guiding means are formed centered on the mid-point of the transverse opening edges and provide guidance to the filmstrip out of the aperture as it is advanced past the transverse opening edges during transport thereof. The guiding means are preferably sculpted, arcuate, reliefs formed extending through the base surface and outward of the transverse opening edges in a half conical shape. In a further aspect of the invention, employable with or without the guiding means in the base, the photographic filmstrip clamping apparatus, and method of operation thereof, is operable in a contact position for clamping and flattening a filmstrip image frame with respect to a fixed aperture and in a retracted position for unclamping and allowing rapid transport of the filmstrip past the fixed aperture by a filmstrip transport mechanism and further comprises in combination with the above described base, a first clamping member having means for applying longitudinal clamping force to the filmstrip in relation to the longitudinal opening edges of the aperture, a second clamping member having means for applying transverse clamping force to the filmstrip in relation to the transverse opening edges of the aperture to accommodate the filmstrip image frame, first means for moving the first clamping member from its retracted position spaced from the longitudinal opening edges during transport of the filmstrip to its contact position with the longitudinal surfaces of the filmstrip for pressing the longitudinal surfaces thereof against the flat surface of the base, second means for moving the second clamping member from its retracted position spaced from the transverse opening edges during transport of the filmstrip to a contact position with the transverse surfaces of the filmstrip for pressing the transverse surfaces thereof against the flat surface of the base, whereby film transport of a filmstrip having a transverse curl is guided at its longitudinal edges by contact with the flat surface of the base and the first clamping member in the retracted position thereof and is unimpeded by the second clamping member in the retracted position thereof.

In a preferred embodiment, the first clamping member has a pair of longitudinally extending clamping elements spaced apart in relation to the longitudinal opening edges to accommodate the filmstrip image frame, and the second clamping member has a pair of transversely extending clamping elements spaced apart in relation to the transverse opening edges to accommodate the filmstrip image frame. The pair of longitudinally extending clamping elements of the first clamping member are coupled together by a transverse bridge member formed apart from or upward of the transport path of the filmstrip. The pair of transversely extending clamping elements spaced apart in relation to the longitudinal opening edges of the base aperture to accommodate the filmstrip image frame of the second clamping member extend across and apart from the transport path of the filmstrip sufficiently to provide clearance for the transport of filmstrip having a transverse curl toward the second clamping member (i.e., upward) and are coupled together by a pair of longitudinal bridge members each formed to respectively extend alongside one of the pair of longitudinally extending clamping elements of the first clamping member.

Preferably, the first and second moving means advance the first and second clamping members from their respective retracted positions into contact with the filmstrip in timed relation, whereby the longitudinal edges of the filmstrip image frame are first at least partially flattened by initial contact of the longitudinally extending clamping elements with the filmstrip and are completely flattened along with the transverse edges of the filmstrip image frame as the first and second clamping members are advanced fully to their respective contact positions. The filmstrip is therefore flattened by the sequential advancement of the first and second clamping means by the first and second moving means, respectively.

The first and second moving means operate from a single drive and through first and second suspension means for normally suspending and biasing the first and second clamping members in their respective retracted positions. The second clamping member in a nested relation with the first clamping member such that the transversely extending clamping elements are positioned to extend between the pair of longitudinally extending clamping elements when moved to said contact position by said second moving means.

The invention thus advantageously allows excessively curled filmstrips to be rapidly and automatically transported into and across the printer aperture and filmstrip flattening mechanism without stubbing the leading end of the filmstrip. The invention has particular application to the transport of the second order web depicted in FIG. 1, where each filmstrip segment presents a curled segment end that is prone to stub on interfering components. The invention diminishes this likelihood of occurrence while maintaining a fast response time over a short path of travel of movable clamping members located on only one side of the filmstrip. Thus, malfunctions occasioned by excessively curled filmstrips in film transporting equipment during photofinishing may be avoided, reducing filmstrip damage, cost and time lost in repeating photofinishing operations.

BRIEF DESCRIPTION OF THE DRAWINGS

Other objects, advantages and features of the present invention will become apparent from the following specification when taken in conjunction with the accompanying drawings in which like elements are commonly enumerated and in which.

The drawings are not necessarily to scale.

DETAILED DESCRIPTION OF THE PREFERRED EMBODIMENTS

Figure 2:
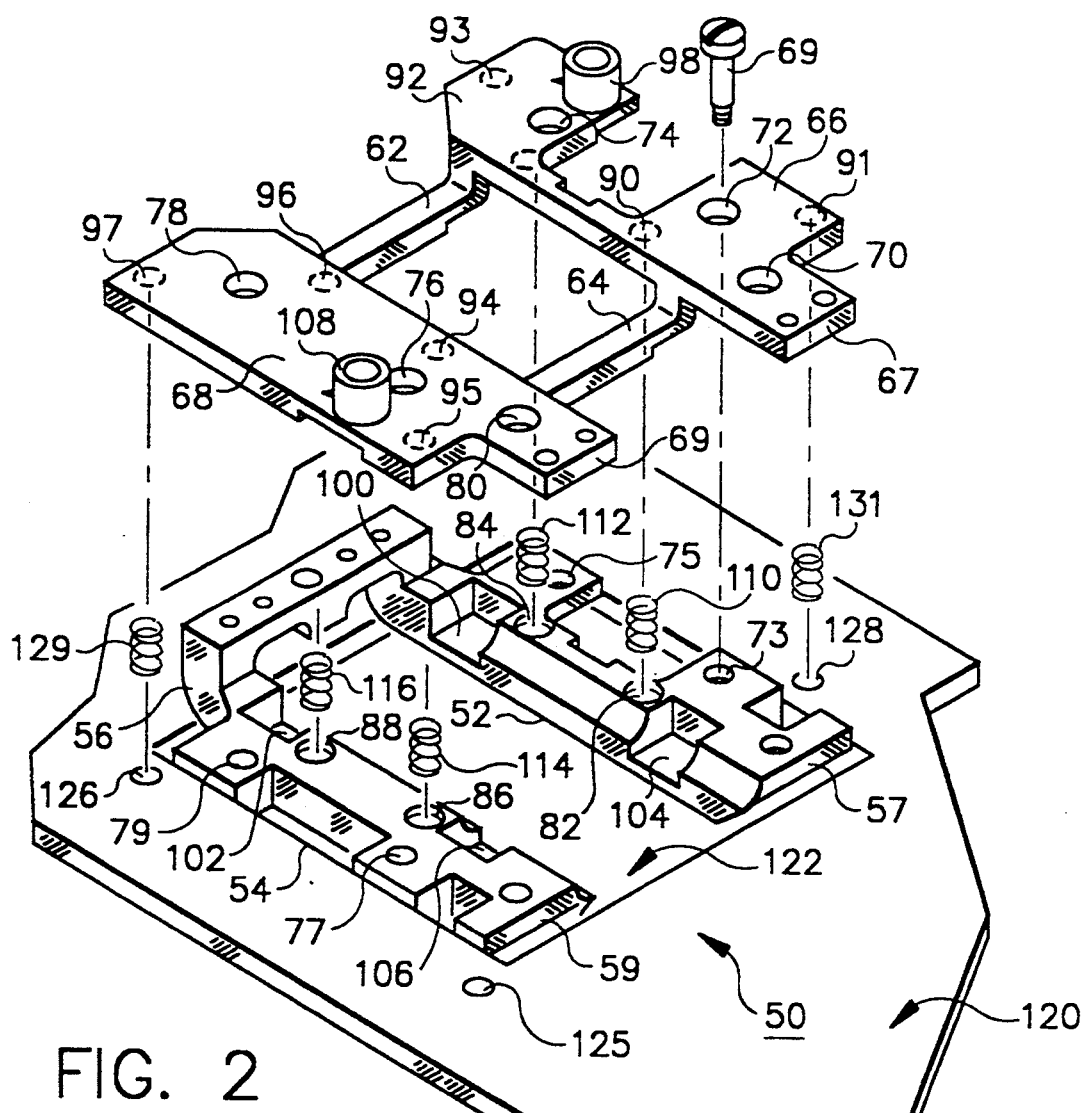
FIG. 2 is a simplified, exploded perspective view of the base and first and second clamping members and associated components of the invention showing their relative retracted positions.
Figure 3:
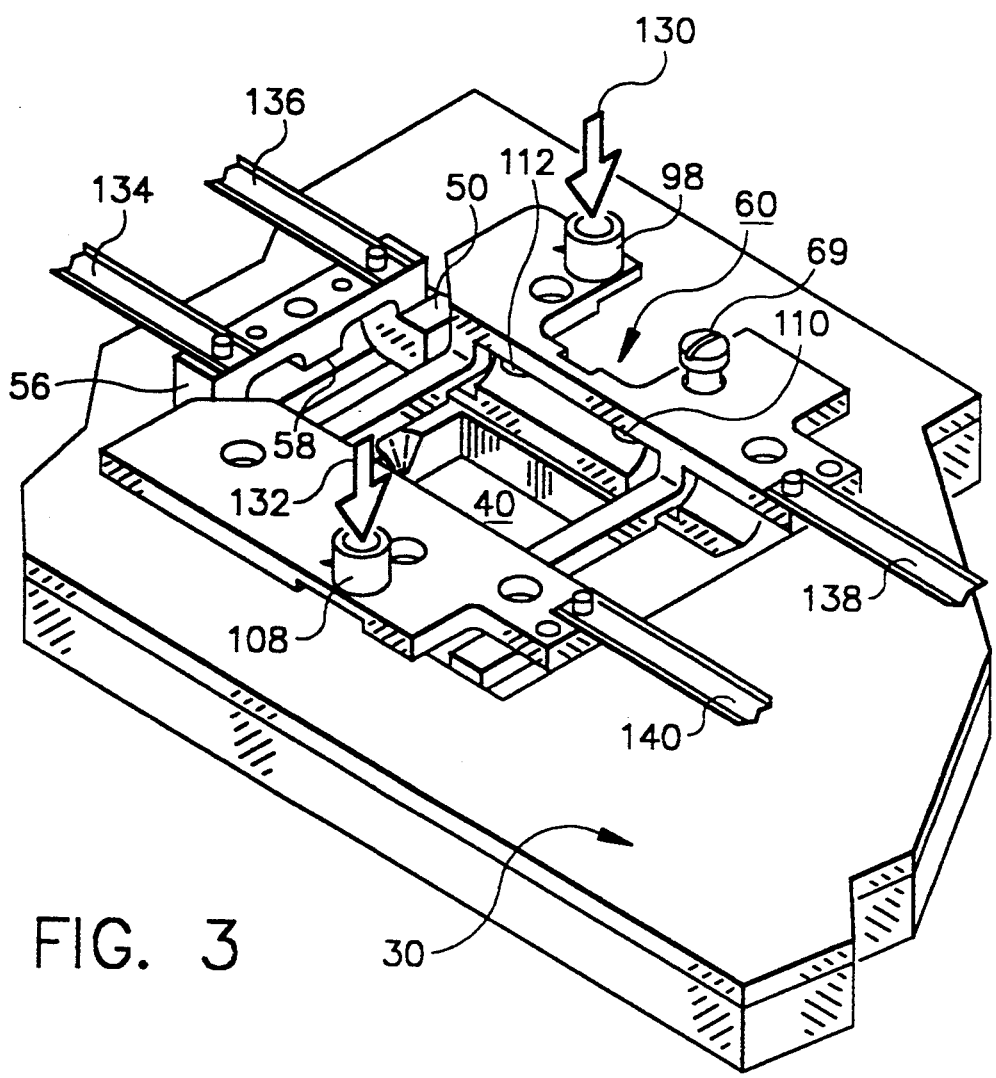
FIG. 3 is a simplified, perspective view of the base and first and second clamping members of the invention showing their relative contact positions.

Turning now to the drawings, and first to FIGS. 2 and 3, the base 30 and first and second clamping members 50 and 60 of the invention are depicted to show their relative positions when retracted apart and contacted together. The base 30 may be a standard plate surrounding an aperture 40 in the transport path of negative film at which a stationary filmstrip image frame is illuminated for either photometric image analysis by a sensor array or for exposing the image on photosensitive print paper in making prints. In the exploded view of FIG. 2, the second order filmstrip segment 10 is depicted in relation to its path of transport in a transport gap between a support plate 120 and the aperture 40 in base 30. The first and second clamping members 50, 60 are suspended in nested relation to one another to fit their filmstrip contacting longitudinally and laterally extending contact surfaces within the support plate gap 122 and to extend downward through the transport gap and to make contact with and apply normal force against the longitudinal and lateral edges or borders of each image frame on the filmstrip 10 centered with respect to the aperture 40.

In the CLAS35 automatic photographic printer sold by Eastman Kodak Co., for example, aperture 40 would be the printing aperture between the lamp house and shutter mechanism. Negative filmstrips connected in either first order or second order webs would be advanced over the surface 38 of base 30 and past the aperture 40 at a rapid rate, halted to center each image frame of the filmstrip (e.g. image frames $18_1$–$18_4$ of FIG. 1) and exposed momentarily to light emitted from the lamp house and filtered to the color density of the negative image for an exposure time determined in a linear scanning of the image frame earlier in the transport path. As described above, the leading ends of the filmstrips may be cuffed toward or away from the aperture 40 and must be flattened prior to exposure.

In FIG. 2, the aperture 40, depicted in perspective view (showing through filmstrip 10 for convenience of illustration), is rectangular and dimensioned to correspond to the image frame dimensions of the filmstrip 10. The longitudinal opening edges 42, 43 and corresponding side walls 32, 33 in base 30 extend in the direction of transport of the filmstrips. The transverse opening edges 44, 45 and corresponding side walls 34, 35 in base 30 extend across the path of transport.

Figure 1:
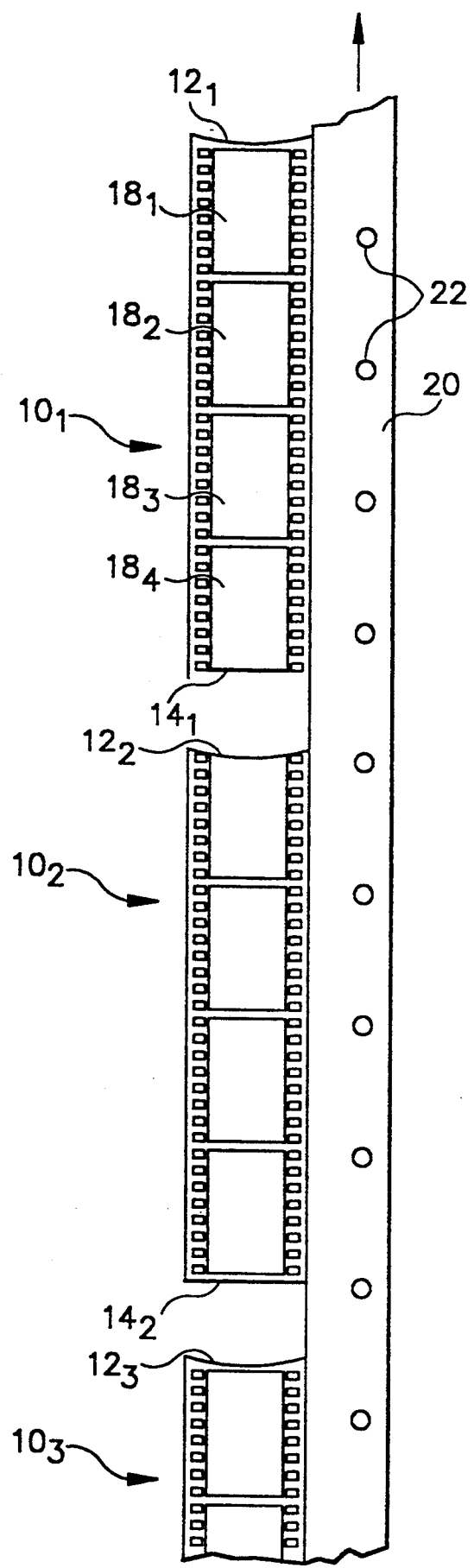
FIG. 1 is a top view of a second order web of side attached filmstrip segments.

In order to alleviate the tendency of the free, leading ends of the filmstrips, particularly of the second order web of FIG. 1, to snag or stub against the transverse opening edges 44, 45 and corresponding side walls 34, 35 in base 30 during advancement, sculpted, arcuate, reliefs 46, 47 are formed therein. The reliefs 46, 47 extend through the base surface 38 and the transverse opening side walls 34, 35 and are centered on the midpoints of said transverse opening edges 44, 45 as measured from the longitudinal opening edges 42, 43.

Figure 4:
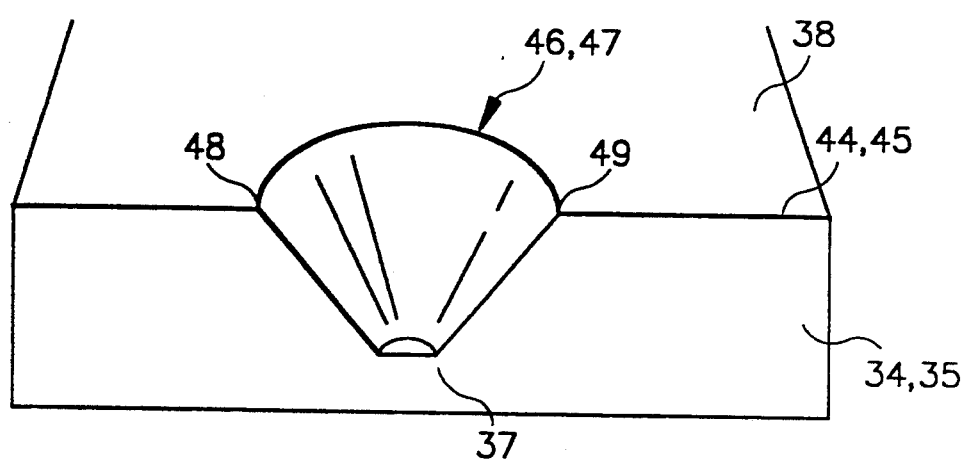
FIG. 4 is a simplified end view of the sculpted relief formed in the transverse opening edges and sidewalls of the base aperture.

In reference to FIG. 4, it may be seen that the reliefs 46, 47 are generally conically formed as half cones centered downward in the transverse opening edges 44, 45. The base diameters of the half cone shaped reliefs 46, 47 are defined by the dimension points 48, 49 along the transverse opening edges. The half cone shaped reliefs 46, 47 are truncated at the cone point 37 part way through the side walls 34, 35.

In a preferred implementation, the dimension between the points 48, 49 is 0.5 inches or 53% of the total length of the transverse opening edges 44, 45 of the aperture dimensioned to the image frames of 35 mm film. The range of suitable dimensions between the points 48, 49 for 35 mm film is preferably about 20% to 75% of the total length of the transverse opening edges 44, 45. The depth of the half cone shaped, sculpted relief from the surface of the base to the flattened cone point 37 is selected in reference to the restraint offered to the longitudinal edges of the filmstrip by the first clamping member described hereafter. For the CLAS35 printer, the depth is selected to be 0.2 inches, resulting in a 45° conical cross section angle from the flattened point 37.

The reliefs 46, 47 function as funnels and provide guidance of the leading end of a filmstrip out of the base aperture 40 as the leading end is advanced into and across the reliefs during filmstrip transport. The sculpted reliefs eliminate the need for lower transverse elements that are movable out of the way of the advancing curled leading edge of each filmstrip in a manner described below.

It has been found that the shape and dimensions of the sculpted reliefs 46, 47 do not have any deleterious effect on transverse filmstrip flattening by the film flattening apparatus operating in its flattening mode described hereafter. In particular, it has been found that the transverse opening edges 44, 45 do not need to support the filmstrip toward the mid-point thereof for the film to be flattened transversely, regardless of the degree or direction of transverse film curl. Sculpting of the transverse opening edges 44, 45 to eliminate filmstrip segment stubbing can be accommodated without sacrificing flatness and without adding the complexity of movable lower transverse opening edges of the aperture 40.

Referring now to the first and second clamping members 50 and 60, they are depicted as widely separated in the exploded view of FIG. 2 and in their nested together, contact position with respect to the base 30 in FIG. 3 for convenience of illustrating their relationship and configuration. The support plate 120 and filmstrip 10 are not illustrated in FIG. 3 in order to better depict the contact position. The positioning of the first and second clamping members 50 and 60 with respect to upward and downward curled film in the retracted and contact positions are shown in FIGS. 5–9.

The first clamping member 50 has a pair of longitudinally extending clamping elements 52, 54 spaced apart in relation to the longitudinal opening edges 42, 43, respectively, to accommodate, i.e., not substantially block, the filmstrip image frame in the transverse direction. The second clamping member 60 has a pair of transversely extending clamping elements 62, 64 spaced apart in relation to the transverse opening edges 44, 45, respectively, to accommodate, i.e., not block, the filmstrip image frame in the longitudinal direction. The film transport mechanism (not shown) guides the filmstrips transversely to position it accurately over the aperture 40 and includes a conventional image frame leading edge detector for stopping advancement with the image frame accurately positioned longitudinally with respect to the aperture, as described, for example, in the above referenced '874 patent.

The pair of longitudinally extending clamping elements 52, 54 of the first clamping member 50 are coupled together by a transverse bridge member 56 formed apart from or upward of the transport path of the filmstrip. The pair of transversely extending clamping elements 62, 64 are of a length that seats into and extends between the pair of longitudinally extending clamping elements 52, 54 of the first clamping member 50 when the first and second clamping members 50, 60 are moved downward or toward the base 30 as shown in FIG. 3.

In the simplified drawings of FIGS. 2-9, the suspension components that separate and maintain the first and second clamping members 50, 60 apart from each other and the base 30 in the retracted position are not completely depicted. Similarly, not all the guide members for guiding the first and second clamping members 50, 60 in registration with one another and the aperture 40 during movement from the retracted to the contact position in response to applied force are shown. However, they can be described as follows in order to more adequately prepare for the explanation of FIGS. 5-9.

The transversely extending clamping elements 62, 64 are supported to extend downward or toward the base 30 and are coupled together by a pair of longitudinal bridge members 66, 68 formed to respectively extend alongside and overly the upper surfaces of the longitudinally extending clamping elements 52, 54 of the first clamping member 50. When the transversely extending clamping elements 62, 64 are moved toward the first clamping member 50, the ends of each element 62, 64 is received in transversely extending recesses 100, 102, 104, 106 formed in the longitudinally extending clamping elements 52 and 54. The longitudinal bridge members 66, 68 have a first set of guide holes 70, 72, 74, 76, 78, 80 for receiving guide pins that extend toward and are either screwed into screw holes in the stationary support plate 120 or are attached to aligned, threaded holes 73, 75, 77, 79 in the longitudinally extending clamping elements 52 and 54. One such guide pin 69 is depicted in alignment with guide hole 72 and threaded hole 73. Four of the guide pins, e.g. pin 69, are fitted through the spaced holes 72, 74, 76, 78 extending through the bridge members 66, 68 and screwed into the threaded holes 73, 75, 77, 79, respectively, of the longitudinally extending clamping elements 52, 54 to provide the nested alignment of the first and second clamping members 50, 60, and may be adjusted to lift or lower the retracted position of the second clamping member 60 to thereby lift or lower the transversely extending clamping elements 62, 64. The further guide holes 70 and 72 receive further guide pins (not shown) extending upward from support plate 122 to stabilize the second clamping member 60. All of the guide pins allow up and down movement, but restrict lateral movement in any direction, of the first and second clamping members 50, 60.

The separation of the first and second clamping members 50, 60 is effected by a set of compression springs 110, 112, 114, 116 which tend to force the clamping members apart. A first set of bores 90, 92, 94, 96 made in the lower side of longitudinal bridge members 66, 68 are aligned with the set of four spring retaining bores 82, 84, 86, 88 in the upper surface of longitudinally extending clamping elements 52, 54 for receiving and positioning the ends of compression coil springs 110, 112, 114, 116, respectively.

A second set of bores 91, 93, 95, 97 in the lower surface of longitudinal bridge members 66, 68 are aligned to respective bores in the support plate 120, e.g. the three bore holes 125, 126 and 128 visible in FIG. 2, for maintaining a second set of compression coil springs, e.g. the coil springs 129 and 131 visible in FIG. 2. In addition, the ends 67, 69 of the longitudinal bridge members 66, 68, respectively are attached to fiat spring members (shown in part as spring members 138, 140 in FIG. 3) extending longitudinally and attached at their other ends to a stand-off (not shown) attached to the support plate 120, so that the fiat spring members extend generally parallel with the support plate in the retracted position of the second clamping member 60. The combined effect of the coil and fiat springs suspend the second clamping member 60 from the support plate 120 and from the first clamping member 50 in the retracted, rest position during transport of the filmstrip 10.

Similarly, the transverse bridge member 56 is attached to a pair of longitudinally extending fiat spring members (shown as 134, 136 in FIG. 3) which are attached to the support plate 120 through a further stand-off (not shown) so that the fiat spring members 134, 136 extend generally parallel with the first clamping member 50 in its retracted, rest position. Thus, the fiat springs and coil springs c-operate with the guide pins as described above to suspend and support the first and second clamping members 50, 60 and only allow them to move up and down with respect to the support plate aperture 122.

The support plate 120 is formed with the aperture 122 which is shaped to generally outline the outer boundaries of, and to allow up and down movement of, the lower surfaces of the longitudinally and transversely extending clamping elements 52, 54, 62, 64. The support plate 120 is spaced from and parallel to the surface 32 of base 30 to form the gap for the longitudinal path of travel of the first or second order web. The support plate lower surface opposite to the upper surface of base 30 may be formed with a groove or contoured to receive the transversely curled or upwardly bowed filmstrip along the path of travel over the base 30.

Figure 5:
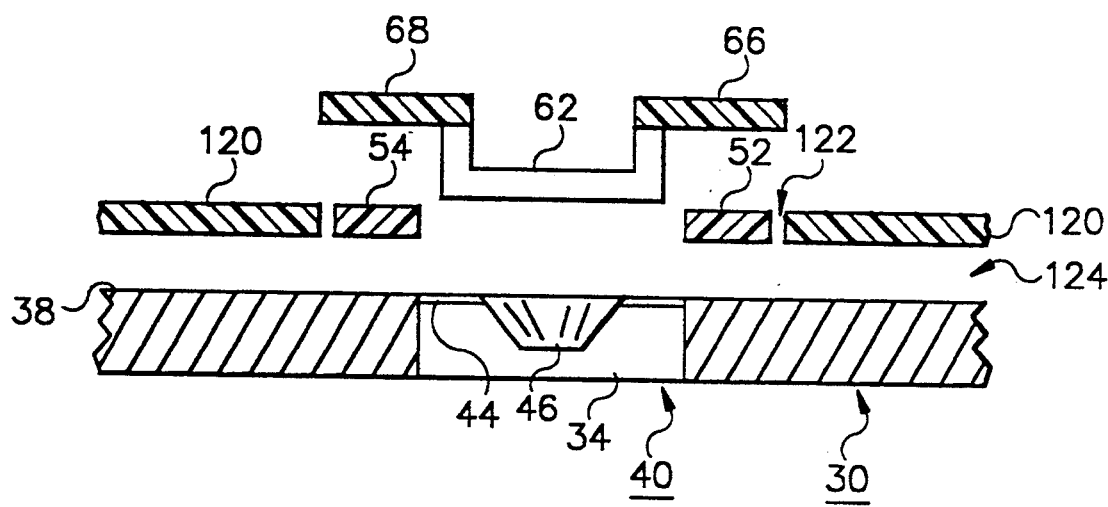
FIG. 5 is a simplified cross-section view of the base and first and second clamping members in their retracted positions.

In this fashion, the first and second clamping members 50, 60 are suspended, aligned and separated apart in their retracted positions depicted in FIG. 5. In the retracted position, the lower surfaces of the longitudinally extending clamping elements 52, 54 are aligned in the support plate aperture 122 flush with the lower surface of the support plate 120, so that they do not interfere with the transport path between the surface 38 of the base 30 and the lower surface of the support plate. The transversely extending clamping elements 62, 64 extend across and apart from the transport path of the filmstrip suspended in the retracted position sufficiently to provide clearance for the transport of filmstrip having a transverse curl bowed centrally toward the second clamping member (i.e., bowed upward).

Referring now to both FIGS. 2 and 3, a pair of upwardly extending circular hollow posts 98 and 108 are attached to the longitudinal bridge members 66 and 68. A prime mover (not shown) is coupled by spring loaded pins (not shown) extended into the hollow posts 98, 100 so that downward force may be applied in the direction of the arrows 130, 132 (shown in FIG. 3) when the prime mover is actuated, onto the bridge members 66 and 68. The downward force is transferred through the coil springs 110, 112, 114, 116 which do not initially compress. Instead, the leaf springs 134, 136, and 138, 140 suspending the first and second clamping members 50 and 60, respectively, bend slightly, but only in the vertical direction. The first clamping member 50 is first moved downward or toward the base 30 through the aperture in the support plate until its further movement is prevented when the lower surfaces of the longitudinally extending clamping elements 52, 54 press against the longitudinal edges of the filmstrip and press it against the upper surface of the base 30. Further downward movement force applied by the prime mover compresses the coil springs 110, 112, 114, 116 and causes further bending of the leaf springs 134, 136, 138, 140, forcing the second clamping member 60 downward or toward the base 30. Thus, the coil springs act in conjunction with the leaf springs under the influence of the prime mover as first moving means for initially moving the first clamping member 50 and then act as second moving means for moving the second clamping member 60 sequentially in one continuous downward stroke. The downward movement of the first and second clamping members 50 and 60 and the compression force on the borders of the filmstrip is limited by the limits of flexure of the spring suspension system. Moreover, the spring loaded pins (not shown) in the hollow posts 98, 108 compress to absorb excess force applied by the prime mover at arrows 130, 132.

Figure 6:
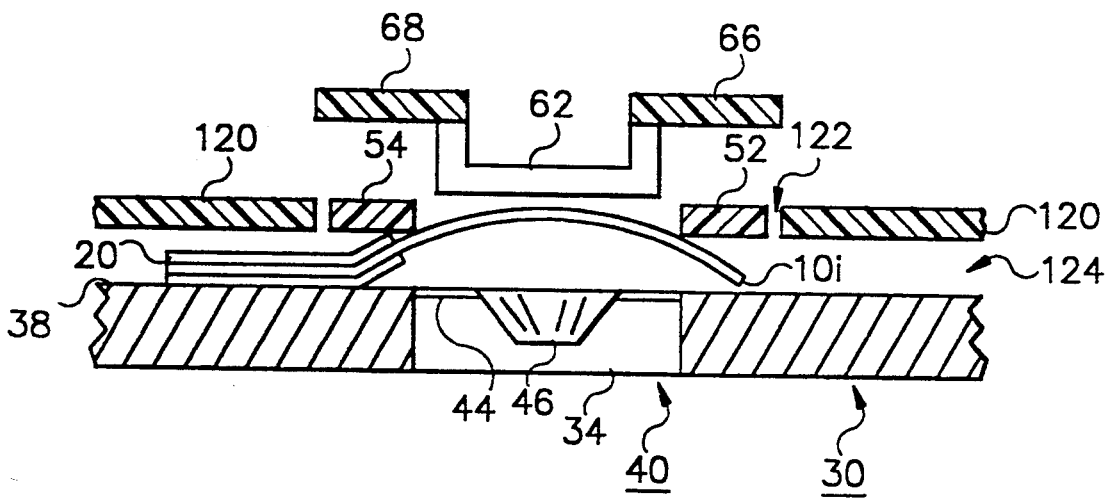
FIG. 6 is a simplified cross-section view of the base and first and second clamping members in their retracted positions with a filmstrip curled toward the clamping members.

In reference now to FIGS. 5 and 6, the relationship of the transversely extending clamping elements 62, 64 and longitudinal bridging members 66, 68 to the longitudinally extending clamping elements 52, 54 and the base 30 and aperture 40 are depicted in simplified cross-section. The support plate 120 and plate aperture 122 are also partially depicted in cross-section to show their relation to the clamping members and base. As mentioned above, a transport path gap 124 is formed between the support plate 120 and the longitudinally extending clamping elements 52, 54 in their retracted position. These components are shown first with an empty transport path gap 124 in FIG. 5 and with a filmstrip segment 10$_i$ and side attached tow web 20 extending into the transport path gap 124 in FIG. 6. In each of FIGS. 5–9, it will be assumed that the transport path through gap 124 is into the drawing and toward the transverse opening edge 44 and sidewall 34 containing the sculpted relief 46. In addition, it will be understood that the surfaces of the longitudinally extending clamping elements facing the gap 124 are formed with skids at each end thereof (as shown at ends 57, 59 in FIG. 2) so that the surfaces may extend somewhat below the plate aperture 122, and the exact position may be adjusted through adjustment of the lengths of the guide pins extending through the guide holes of each clamping member.

In FIG. 6, the filmstrip 10$_i$ demonstrates a transverse curl bowed upward or away from the base aperture 40. The lateral edges of the filmstrip 10$_i$ are restrained and guided in the gap 124 by contact with the base surface 38 and the longitudinally extending clamping elements 52, 54. Thus a severely curled filmstrip is restrained in the bow height that it may assume in the gap 124. As shown in FIG. 6, the bow height is less than the distance between the surface 38 of base 30 and the retracted position of the transversely extending clamping elements 62, 64. Consequently, upwardly bowed leading ends of filmstrips or filmstrip segments, e.g. upwardly bowed leading ends 12$_i$ of the second order web depicted in FIG. 1, are flattened slightly and do not interfere with or stub against the transversely extending clamping elements 62, 64.

Figure 7:
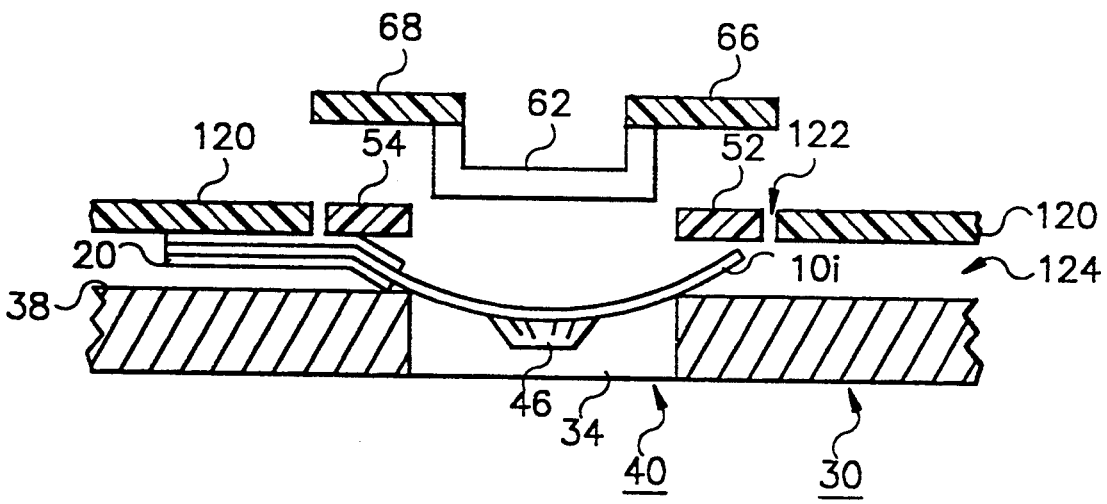
FIG. 7 is a simplified cross-section view of the base and first and second clamping members in their retracted positions with a filmstrip curled away from the clamping members.

In FIG. 7, the filmstrip segment 10$_i$ is depicted with a curl bowing downward or toward the aperture 40. Again, the lateral edges of the filmstrip 10$_i$ are restrained and guided in the gap 124 by contact with the base surface 38 and the longitudinally extending clamping elements 52, 54. Thus a severely curled filmstrip is restrained in the bow depth that it may assume in the gap 124. As described above with respect to FIG. 4, the downwardly bowed leading ends of filmstrips or filmstrip segments, e.g. downwardly bowed leading ends 12$_i$ of the second order web depicted in FIG. 1, are funneled by the sculpted reliefs 46, 47 out of the aperture 40 and do not interfere with or stub against the transverse opening side walls 34, 35.

Figure 8:
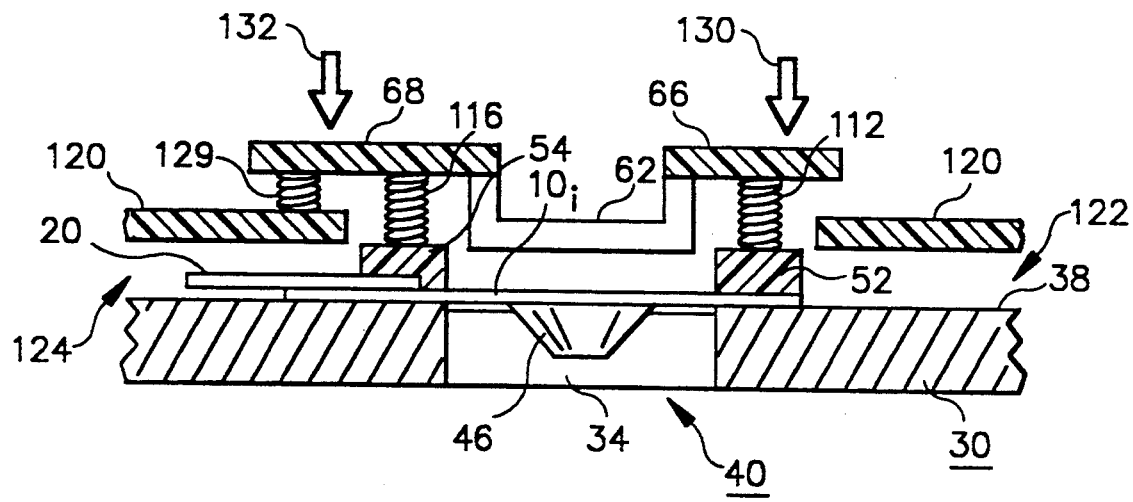
FIG. 8 is a simplified cross-section view of the base and first and second clamping members in the partial contact position pressing the first contact member against a filmstrip.
Figure 9:
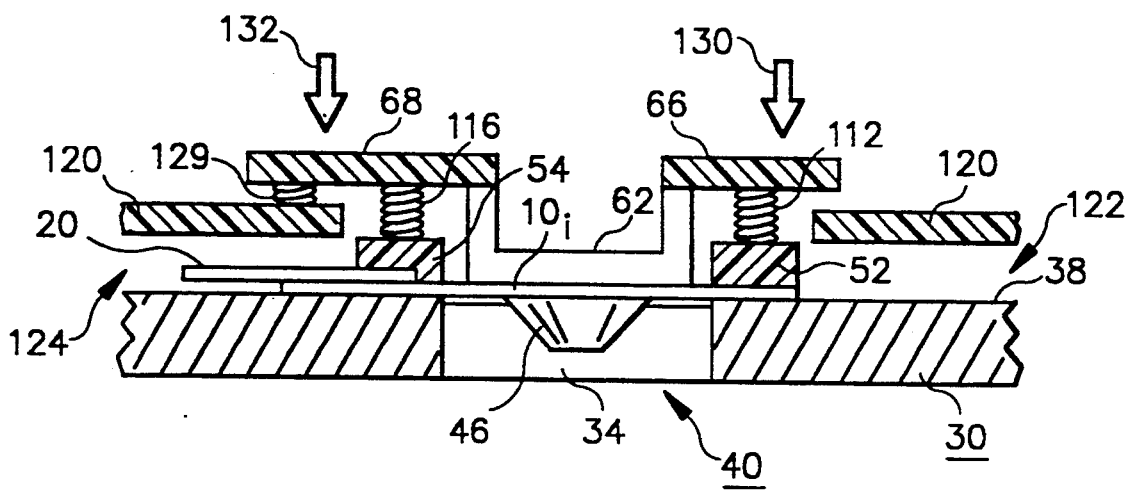
FIG. 9 is a simplified cross-section view of the base and first and second clamping members in the full contact position pressing the first and second contact members against a filmstrip.

Turning now to FIGS. 8 and 9, they depict the sequence of operation of the first and second moving means in advancing the first and second clamping members 50 and 60 from their respective retracted positions into contact with the filmstrip segment 10$_i$ in timed relation. They also depict the coil springs 112, 116 and 119 which are compressed with contact with the filmstrip segment and application of the force at arrows 130 and 132. The longitudinal edges of the filmstrip outside the image frame (in the side regions of the sprocket holes of 35 mm filmstrips) are first at least partially flattened from the positions depicted in FIGS. 7 and 8 by initial partial movement of the longitudinally extending clamping elements 52, 54 as shown in FIG. 8. Force is applied against the second clamping member by the prime mover in a continuous stroke, but the initial partial movement of the longitudinally extending clamping elements 52, 54 is effected through the resistance of the coiled springs 110, 112, 114, 116 and until they compress.

In FIG. 9, full film flattening is achieved by continued movement of the second clamping member 60 on compression of the coiled springs 110, 112, 114, 116 (and the other support plate compression springs). The continued movement advances the transversely extending clamping elements 62, 64 between and into alignment with the longitudinally extending clamping elements 52, 54 in the nested relationship described above with respect to FIG. 3. Thus, the image frame of the filmstrip 10$_i$ is completely flattened along the longitudinal or lateral and the transverse edges thereof as the first and second clamping members 50 and 60 are advanced fully to their respective contact positions. The filmstrip is therefore flattened by the sequential advancement of the first and second clamping means by the first and second moving means operating through the first and second suspension means, respectively.

As described above, the film flattening apparatus and method of preferred embodiment of the invention thus operates in a film transport mode to provide for partial flattening of transversely curled filmstrip segments and guidance of leading ends thereof out of interference with transversely extending aperture opening edges or clamping elements and in a film flattening mode to rapidly move clamping elements located on only one side of the filmstrip a short path of travel to contact and flatten the stationary filmstrip.

The longitudinally extending clamping elements 52, 54 and base surface 38 define transport path gap 124 and operate in the first mode as a space gate to control the amount of transverse curl, and hence the height or depth of the filmstrip. The control of the film height allows for the adjustment of the retracted position of the second clamping member toward the transport path gap 124 and shortens its path of travel in the second mode. The shortened path of travel minimizes the stroke and time required to advance and retract the clamping members 50, 60, thereby enhancing printer productivity. The optimal operating gaps between the transversely and longitudinally extending clamping elements 62, 64, and 52, 54, in their retracted positions, and the base surface 38 is 0.125 inches and 0.022 inches, respectively, for the CLAS35 printer. A wider operating gap range is possible employing the above described principles of the invention.

Although the transversely extending clamping elements have been depicted as having flat surfaces, it will be understood that they may be curved upwardly or away from the base 30 centrally along their length to provide additional clearance for the central portions of upwardly curled filmstrips.

While there has been shown what are considered to be the preferred embodiments of the invention, it will be manifest that many changes and modifications may be made therein without departing from the essential spirit of the invention. It is intended, therefore, in the following claims to cover all such changes and modifications as may fall within the true scope of the invention.

PARTS LIST filmstrip segments $10_1$–$10_n$
leading ends $12_1$–$12_n$
trailing ends $14_1$–$14_n$
gaps $16_1$–$16_n$
image frames $18_1$–$18_4$
side attached tow web 20
web sprocket holes 22
base 30
longitudinal opening side walls 32, 33
transverse opening side walls 34, 35
cone point 37
base surface 38
base aperture 40
longitudinal opening edges 42, 43
transverse opening edges 44, 45
sculpted reliefs 46, 47
diameter points 48, 49
first clamping member 50
longitudinally extending clamping elements 52, 54
transverse bridge member 56
ends 57, 59
boss 58
second clamping member 60
transversely extending clamping elements 62, 64
ends 67, 69
longitudinal bridge members 66, 68
alignment pin 69
first set of guide holes 70, 72, 74, 76, 78, 80
aligned threaded holes 73, 75, 77, 79
spring retaining bore holes 82, 84, 86, 88
first set of pin holes 90, 92, 94, 96
second set of pin holes 91, 93, 95, 97
upwardly extending circular hollow post 98
transversely extending recesses 100, 102, 104, 106 upwardly extending
circular hollow post 108
pin centered, compression coil springs 110, 112, 114, 116
support plate 120
plate aperture 122
transport path gap 124
holes 125, 126, 128
springs 129, 131
force arrows 130, 132
leaf springs 134, 136, 138, 140

We claim:

1. Filmstrip flattening apparatus operable in a contact position for clamping and flattening a filmstrip image frame with respect to a fixed aperture and in a retracted position for unclamping and allowing rapid transport of filmstrips evidencing transverse film curl tending to urge said filmstrip into said fixed aperture past said fixed aperture by a filmstrip transport mechanism, said apparatus comprising:

a base having said fixed aperture formed in a flat surface thereof and extending through said base, said fixed aperture bounded by a pairs of transverse and longitudinal opening edges and side walls spaced apart to accommodate said filmstrip image frame;

clamping means operable in a retracted position for allowing rapid transport of said filmstrip past said base and defining a transport gap with said base while making longitudinal contact with the longitudinal edge surfaces of said filmstrip for at least partially restraining the transversely curled filmstrip during transport, said clamping means operable in a contact position for applying clamping force longitudinally along the longitudinal edge surfaces and transversely across the filmstrip surface bordering an image frame thereof to flatten the image frame against said fixed aperture when transport is halted; and filmstrip guiding means formed in at least one of said transverse opening edges and side walls of said fixed aperture for guiding the leading end of a filmstrip having said transverse film curl, in a direction away from said fixed aperture, and into said transport gap, during the transport thereof by said transport mechanism to avoid stubbing of the leading end of said filmstrip on said transverse opening edges and side walls due to said transverse film curl.

2. The apparatus of claim 1 wherein said filmstrip guiding means is formed in both of said pair of spaced apart transverse opening edges and side walls.

3. The apparatus of claim 2 wherein said base has a thickness within which first and second reliefs are formed extending through said base surface and said pair of transverse opening side walls, said reliefs centered on the mid-points of said transverse opening edges in relation to said longitudinal opening edges and providing guidance out of said fixed aperture to a filmstrip as it is advanced into and across said reliefs during transport thereof by said transport mechanism.

4. The apparatus of claim 3 wherein said reliefs are each formed with a conical relief shape extending into said base and said transverse opening side wall from said base surface to a point in each respective one of said transverse opening side wall.

5. The apparatus of claim 1 wherein said base has a thickness within which a relief is formed extending through said base surface and opening edge of at least one of said transverse opening edges, said relief centered on the mid-point of said transverse opening edge in relation to said longitudinal opening edges and providing guidance out of said fixed aperture to a filmstrip as it is advanced into and across said relief during transport thereof by said transport mechanism.

6. The apparatus of claim 3 wherein said sculpted relief is formed with a conical relief shape extending into said base and said transverse opening side wall from said base surface to a point in said transverse opening side wall.

7. The apparatus of claim 1 wherein said clamping means further comprises:
   means for providing clearance for a filmstrip transversely curled toward said clamping means during transport of the filmstrip across said fixed aperture by said transport mechanism when said clamping means is in its retracted position.

8. The apparatus of claim 1 wherein said clamping means further comprises:
   a first clamping member having a pair of longitudinally extending clamping elements spaced apart in relation to said longitudinal opening edges to accommodate the transverse dimension of said filmstrip image frame;
   a second clamping member having a pair of transversely extending clamping elements spaced apart in relation to said transverse opening edges to accommodate the longitudinal dimension of said filmstrip image frame;
   first moving means for moving said first clamping member from a retracted position spaced from said longitudinal opening edges during transport of the filmstrip to a second position into contact with said longitudinal edge surfaces of said filmstrip for pressing said longitudinal edge surfaces against the flat surface of said base; and
   second moving means for moving said second clamping member from a retracted position spaced from said transverse opening edges during transport of the filmstrip to a contact position into contact with said transverse surfaces of said filmstrip for pressing said transverse surfaces thereof against the flat surface of said base.

9. The apparatus of claim 8 wherein said first moving means and said second moving means advance said first clamping member and said second clamping member, respectively, from their respective retracted positions into their contact positions and into contact with the filmstrip in a predetermined sequence, whereby the longitudinal edge surfaces of the filmstrip image frame are first flattened against said base surface by contact with said longitudinally extending clamping elements advanced toward said base by said first moving means, and the transverse edges of the filmstrip image frame are flattened against said base surface by contact with said transversely extending clamping elements advanced toward said base by said second moving means.

10. The apparatus of claim 8 wherein said longitudinally extending clamping elements are spaced apart from said base surface to form a transport gap for filmstrip transport past said aperture when said first and second clamping members are in said retracted positions, whereby transport of a filmstrip having a transverse curl is guided at and restrained at its longitudinal edge surfaces within said transport gap and is unimpeded by said transversely extending clamping elements of said second clamping member in the retracted position thereof.

11. Filmstrip flattening apparatus operable in a contact position for clamping and flattening a filmstrip image frame with respect to a fixed aperture and in a retracted position for unclamping and allowing rapid transport of the filmstrip past the fixed aperture in a transport path by a filmstrip transport mechanism, said apparatus comprising:
   a base having said fixed aperture formed in a flat surface thereof and extending through said base, said fixed aperture bounded by a pairs of transverse and longitudinal opening edges and side walls spaced apart to accommodate the transverse and longitudinal dimensions of the filmstrip image frame;
   a first clamping member having a pair of longitudinally extending clamping elements spaced apart in relation to said longitudinal opening edges to accommodate the transverse dimension of the filmstrip image frame in the space between the longitudinally extending clamping elements;
   a second clamping member having a pair of transversely extending clamping elements spaced apart in relation to said transverse opening edges to accommodate the longitudinal dimension of the filmstrip image frame in the space between the transversely extending clamping elements;
   first moving means for moving said first clamping member from a retracted position, spaced from said longitudinal opening edges during transport of the filmstrip, to a second position into contact with longitudinal edge surfaces of the filmstrip for pressing the longitudinal edge surfaces thereof against the flat surface of the base; and
   second moving means for moving said second clamping member from a retracted position, spaced from said transverse opening edges during transport of the filmstrip, to a contact position into contact with the transverse surfaces of the filmstrip for pressing the transverse surfaces thereof against the flat surface of said base.

12. The apparatus of claim 11 wherein said longitudinally extending clamping elements are spaced apart from said base surface to form a transport gap for filmstrip transport past said aperture when said first and second clamping members are in said retracted positions, whereby transport of a filmstrip having a transverse curl is guided at and restrained at its longitudinal edge surfaces within said transport gap and is unimpeded by said transversely extending clamping elements of said second clamping member in the retracted position thereof.

13. The apparatus of claim 11 wherein said first moving means and said second moving means advance said first clamping member and said second clamping member, respectively, from their respective retracted positions into their contact positions and into contact with the filmstrip in a predetermined sequence, whereby the longitudinal edge surfaces of the filmstrip image frame are first flattened against said base surface by contact with said longitudinally extending clamping elements advanced toward said base by said first moving means, and the transverse edges of the filmstrip image frame are flattened against said base surface by contact with said transversely extending clamping elements advanced toward said base by said second moving means.

14. The apparatus of claim 10 wherein:
said pair of longitudinally extending clamping elements spaced apart in relation to said transverse opening edges of said fixed aperture to accommodate the filmstrip image frame of said first clamping member are coupled together by at least one transverse bridge member formed to extend across and apart from said transport path of the filmstrip sufficiently to provide clearance for the transport of filmstrip having a transverse curl toward said first clamping member; and
said pair of transversely extending clamping elements spaced apart in relation to said longitudinal opening edges of said fixed aperture to accommodate the filmstrip image frame of said second clamping member extend across and apart from the transport path of the filmstrip sufficiently to provide clearance for the transport of filmstrip having a transverse curl toward said second clamping member and are coupled together by a pair of longitudinal bridge members each formed to respectively extend alongside one of said pair of longitudinally extending clamping elements of said first clamping member.

15. The apparatus of claim 14 further comprising:
first suspension means for normally suspending and biasing said first clamping member in its respective retracted position with said pair of longitudinally extending clamping elements positioned apart from said base surface; and
second suspension means for normally suspending and biasing said second clamping member in its respective retracted position in a nested relation with said first clamping member such that said transversely extending clamping elements are positioned to extend between said pair of longitudinally extending clamping elements when moved to said contact position by said second moving means.

16. The apparatus of claim 11 further comprising:
first suspension means for normally suspending and biasing said first clamping member in its respective retracted position with said pair of longitudinally extending clamping elements positioned apart from said base surface; and
second suspension means for normally suspending and biasing said second clamping member in its respective retracted position in a nested relation with said first clamping member such that said transversely extending clamping elements are positioned to extend between said pair of longitudinally extending clamping elements when moved to said contact position by said second moving means.

17. The apparatus of claim 16 wherein said first moving means and said second moving means advance said first clamping member and said second clamping member, respectively, from their respective retracted positions into their contact positions and into contact with the filmstrip in a predetermined sequence, whereby the longitudinal edge surfaces of the filmstrip image frame are first flattened against said base surface by contact with said longitudinally extending clamping elements advanced toward said base by said first moving means, and the transverse edges of the filmstrip image frame are flattened against said base surface by contact with said transversely extending clamping elements advanced toward said base by said second moving means.

18. The apparatus of claim 17 operable upon the application of force to said second clamping member, and wherein:
said first moving means is coupled between said first clamping member and said second clamping member for transferring the applied force from the second clamping member to the first clamping member and effecting movement of said first clamping member to its respective contact position in an initial phase of said stroke; and
said second moving means is coupled between said first clamping member and said second clamping member and effects movement of said second clamping member upon completion of movement of said first clamping member and through continued application of said force through completion of said stroke.

19. The apparatus of claim 15 operable upon application of force to said second clamping member, and wherein:
said first moving means is coupled between said first clamping member and said second clamping member for transferring the applied force from the second clamping member to the first clamping member and effecting movement of said first clamping member to its respective contact position in an initial phase of said stroke; and
said second moving means is coupled between said first clamping member and said second clamping member and effects movement of said second clamping member upon completion of movement of said first clamping member and through continued application of said force through completion of said stroke.

20. A method of clamping the longitudinal and transverse edges of a filmstrip image frame with respect to a fixed aperture of a stationary base, said aperture defined by longitudinal and transverse opening edges formed in a surface of said base, in a flattening mode when filmstrip transport is halted, and unclamping and allowing rapid transport of the filmstrip past the fixed aperture in a transport path by a filmstrip transport mechanism in a transport mode, said method comprising the steps of:
providing spaced apart, longitudinally extending, clamping elements and spaced apart, transversely extending clamping elements;
suspending said spaced apart, longitudinally extending, clamping elements in a retracted position spaced apart from said base surface and forming a transport path gap through which said filmstrips are transported longitudinally in said transport mode by said transport mechanism;
suspending said spaced apart, transversely extending clamping elements in a retracted position spaced apart from said base surface and said transport path gap sufficiently to avoid contact with said filmstrips transported longitudinally in said transport mode by said transport mechanism;
operating said transport mechanism to advance said filmstrip image frames longitudinally through said transport path gap in relation to said fixed aperture in said transport mode, whereby the longitudinal edges of the filmstrip image frame are first at least partially flattened by sliding contact with said longitudinally extending clamping elements and said base surface; and, in said flattening mode:

moving said spaced apart, longitudinally extending, clamping elements from said retracted position into said gap and into a contact position for pressing the longitudinal edges of said filmstrip image frame against said base surface; and moving said spaced apart, transversely extending, clamping elements from their retracted position into said gap and into a contact position for pressing the transverse edges of said filmstrip image frame against said base surface in timed relation to the movement of said longitudinally extending clamping elements, whereby said filmstrip image frame is flattened by pressing contact along the longitudinal and transverse edges of the filmstrip image frame as said transversely extending and longitudinally extending clamping elements are advanced fully to their respective contact positions.

21. The method of claim 20 wherein said second suspending step further comprises:

suspending said transversely extending clamping elements in their respective retracted position in a nested relation with said longitudinally extending clamping elements such that said transversely extending clamping elements are positioned to extend between said longitudinally extending clamping elements when moved to their contact positions.

22. The method of claim 20 wherein said second suspending step further comprises:

suspending said transversely extending clamping elements in their respective retracted position in a nested relation with said longitudinally extending clamping elements such that said transversely extending clamping elements are positioned to extend between said longitudinally extending clamping elements when moved to their contact positions; and biasing said longitudinally extending clamping elements away from said transversely extending clamping elements.

23. Apparatus for clamping the longitudinal and transverse edges of a filmstrip image frame with respect to a fixed aperture of a stationary base, said aperture defined by longitudinal and transverse opening edges formed in a surface of said base, in a flattening mode when filmstrip transport is halted, and unclamping and allowing rapid transport of the filmstrip past the fixed aperture in a transport path by a filmstrip transport mechanism in a transport mode, said apparatus comprising:

spaced apart, longitudinally extending, clamping elements and spaced apart, transversely extending clamping elements;

means for suspending said spaced apart, longitudinally extending, clamping elements in a retracted position spaced apart from said base surface and forming a transport path gap through which said filmstrips are transported longitudinally in said transport mode by said transport mechanism, whereby the longitudinal edges of the filmstrip image frame are first at least partially flattened by sliding contact with said longitudinally extending clamping elements and said base surface;

means for suspending said spaced apart, transversely extending clamping elements in a retracted position spaced apart from said base surface and said transport path gap sufficiently to avoid contact with said filmstrips transported longitudinally in said transport mode by said transport mechanism;

means operable in said flattening mode for moving said spaced apart, longitudinally extending, clamping elements from said retracted position into said gap and into a contact position for pressing the longitudinal edges of said filmstrip image frame against said base surface; and means operable in said flattening mode for moving said spaced apart, transversely extending, clamping elements from their retracted position into said gap and into a contact position for pressing the transverse edges of said filmstrip image frame against said base surface in timed relation to the movement of said longitudinally extending clamping elements, whereby said filmstrip image frame is flattened by pressing contact along the longitudinal and transverse edges of the filmstrip image frame as said transversely extending and longitudinally extending clamping elements are advanced fully to their respective contact positions.

24. The apparatus of claim 23 wherein said second suspending means further comprises:

means for suspending said transversely extending clamping elements in their respective retracted position in a nested relation with said longitudinally extending clamping elements such that said transversely extending clamping elements are positioned to extend between said longitudinally extending clamping elements when moved to their contact positions.

25. The apparatus of claim 23 wherein said second suspending means further comprises:

means for suspending said transversely extending clamping elements in their respective retracted position in a nested relation with said longitudinally extending clamping elements such that said transversely extending clamping elements are positioned to extend between said longitudinally extending clamping elements when moved to their contact positions; and means for biasing said longitudinally extending clamping elements away from said transversely extending clamping elements.

* * * * *